UNITED STATES PATENT OFFICE 2,135,117

POLYMERIZATION OF OLEFINES

Donald R. Stevens, Swissvale, and William A. Gruse, Wilkinsburg, Pa., assignors to Gulf Research & Development Company, Pittsburgh, Pa., a corporation of Delaware No Drawing. Application November 17, 1936, Serial No. 111,334

4 Claims. (Cl. 260—683)

This invention relates to polymerization of olefines, and it comprises a method of treating iso-butylene or gases containing the same for the production of low-boiling liquid polymers useful as a motor fuel, which comprises bringing the olefine gas into contact with sulfuric acid of moderate strength at an elevated temperature sufficient to cause the polymers formed to remain entirely or substantially entirely in the vapor phase, removing the gases and vapors and subsequently recovering the normally liquid polymers therefrom; all as more fully hereinafter set forth and as claimed.

In our copending application Serial No. 54,336, filed December 13, 1935, we disclosed a process of polymerizing iso-butylene comprising absorption of iso-butylene in 60 to 65 percent sulfuric acid at atmospheric temperatures or thereabouts, the acid-olefine mixture being subsequently adjusted in acidity to between 45 and 55 grams per 100 cc. (or the absorption being stopped when the acidity reaches this value) and the acid-olefine mixture being then warmed to separate the polymers. This two-step process is a modification of the well known Butlerow method described in the literature as far back as 1877.

Our present invention comprises a process of polymerizing gaseous olefines in which the absorption and polymerization of olefine in the acid is carried out in a single step.

According to our present invention, the olefine gas consisting of or containing iso-butylene is brought into intimate contact with sulfuric acid of moderate strength, not exceeding about 65 per cent, at an elevated temperature, said temperature being at least as high as the dew point of the composite polymers in the effluent gases, whereby condensation or retention of polymers in the acid mixture is prevented. The polymers are removed as fast as they are formed, in vapor form, the effluent gases being subsequently treated by cooling or absorption to condense and recover the polymers. Preferably, however, the contact between the olefine gas and the acid is carried out at a temperature substantially above the dew point of the total polymer, the preferred operating temperatures being from about 100° to about 200° C.

As indicated hereinabove, the strength of the acid should not be in excess of about 65 per cent, and the best strength is 62 to 63 per cent, but due to the operating temperatures some concentration of the acid normally occurs in a continuous operation. Consequently, when the process is carried out in continuous manner we prefer to introduce acid of lower strength, for example from 50 to 60 per cent sulfuric acid and to remove the acid from contact with the gases at a point corresponding to a strength of from 60 to 65 per cent.

We have found it advantageous to introduce the olefine gas and sulfuric acid of from 50 to 60 per cent into suitable contact apparatus comprising a zone of extended surface, for example a tower filled with pumice, tile, broken stone or the like, the gas and acid traveling concurrently through the zone in contact with each other, and separation of the gas from the acid taking place at a point corresponding to an acid strength of from 60 to 65 per cent. The acid may then be diluted with water to the initial strength and recycled to the polymerizing zone, while the gases and vapors are treated for the recovery of the polymers contained therein, as for example by condensation or absorption.

Alternatively, sufficient moisture may be added to the olefine gas before being brought into contact with the acid in order to offset the normal dehydrating effect and to maintain the acid at the desired concentration; in this instance the acid may be introduced in the desired strength of 60 to 65 per cent, the amount of moisture in the gas being regulated to hold the acid at this concentration. Where this is done, countercurrent flow of gas and acid, or simply passage of the gas through a zone containing a batch of the acid, may be employed with good results.

While pure iso-butylene may be employed as the starting material, it will ordinarily be advantageous to employ the so-called "butane cut" obtained from refinery gases, as for example in the debutanization of cracked gasoline. Such a cut will ordinarily contain a fairly high concentration of iso-butylene, together with 1-butene and 2-butene, normal and iso-butane as well as minor amounts of propane and propylene.

Ordinarily the operation is conducted under some pressure, pressures of from 50 to 700 pounds per square inch being preferred.

With a given concentration of iso-butene in the original gas, variation in the pressures and temperatures of operation will have some effect upon the volatility of the polymer produced; at high temperatures, the polymers formed tend to have lower boiling points. Moreover, the volatility characteristics of the polymers in the effluent gases will establish a minimum temperature of operation, in order to prevent condensation of polymers. These factors are all inter-related, but the operation is in any event so conducted that the polymers vaporize and pass out of the acid as fast as they are formed.

The dew point of the composite polymer in the effluent gases will determine the minimum operating temperature. In most cases there will be definite cross-polymerization effects, with resultant formation of polymers other than di-iso-butylene and tri-iso-butylene.

In continuous operation, recycling of the gas is not ordinarily desirable unless the gas consists largely or entirely of iso-butylene. In order to increase the yield of polymers, the best expedient is to increase the time of contact, as for example by passing the gas through a series of reactors containing the acid.

As mentioned hereinabove, the maximum operating temperature will lie in the neighborhood of 200° C., but in any event should be such as to avoid undesirable oxidational changes. By maintaining maximum acid concentration of not more than 65 per cent $H_2SO_4$, however, such oxidational changes are ordinarily avoided to a large extent at temperatures below 200° C. However, due to the fact that these changes cannot be entirely avoided, the acid gradually darkens and loses effectiveness so that it eventually becomes desirable to remove the acid from the system for reclamation and separation of decomposition products therefrom. The darkening of the acid is, however, much slower than when strong acid is employed, for example, sulfuric acid of 80-90 per cent strength.

In a practical embodiment of our invention, a butane cut containing approximately 33.9 per cent iso-butylene was first saturated with water at about 100° C., under the pressure noted hereinafter, and then introduced into contact with 62.5 per cent sulfuric acid distributed on pumice at an operating temperature of 104° C. and gauge pressure of 30 pounds per square inch. There was obtained a yield of 13.1 per cent of polymers, based on the total charge, or 20.2 per cent, based on the total unsaturates present in the charge. 76.2 per cent of the resultant polymer boiled below 140° C. Decreasing the strength of the acid gave a lower yield. Increasing the strength of the acid, on the other hand, gave a higher yield but a more volatile product; this is important because the total yield may be increased by simply repeating the operation in a plurality of stages. When this is done, our process makes it possible to obtain a higher total yield of gasoline-like polymers (boiling below 140° C.) than could otherwise be obtained.

At the temperature mentioned, the use of acid over 65 per cent strength gave a considerable evolution of $SO_2$, indicating decomposition and side reactions.

Increasing the temperature of operation in general tends to produce a material having a higher volatility ratio, that is to say a material containing a higher proportion of polymers within the gasoline boiling-point range, or, in other words, to increase the relative yield of di-iso-butylene as compared with that of tri-iso-butylene.

After condensation of the polymers, it will ordinarily be desirable to re-distil the polymers to effect debutanization thereof and also to reduce the polymers to that particular end boiling point which is suitable in accordance with use of the polymers as motor fuel, or to separate the dimer from the trimer and other heavier polymers which may be formed.

The polymers thus produced, and particularly that fraction boiling below 140° C. are of exceptional value as motor fuel, having high antiknock value or so-called "octane number". Moreover, the di-iso-butylene obtained also represents an advantageous raw material for the preparation of iso-octane, the advantages of which as a motor fuel are well known.

Wherever sulfur is present in the original gas in such amount and in such form that the polymers would contain sulfur in a form difficult to remove by ordinary methods, it is advantageous to subject the gas to a desulfurization treatment in any known manner before the gas is brought into contact with the polymerizing agent.

It will be apparent to those skilled in the art that whereas our invention has been described hereinabove in connection with various specific operating details, our invention is not in its broadcast aspects limited to such operating details, but may be variously practiced within the scope of the claims hereinafter made.

What we claim is:

1. The process of polymerizing iso-butylene which comprises passing a stream of gases comprising iso-butylene over a catalyst comprising sulfuric acid of from about 50 to about 65 per cent strength at a temperature above the dew point of the composite polymer in the resultant vapors and gas, removing the resultant vapors and gas and recovering normally liquid polymers therefrom.

2. The process of polymerizing iso-butylene which comprises passing a stream of gases comprising iso-butylene over a catalyst comprising sulfuric acid of from about 50 to about 65 per cent strength under a pressure of from 50 to 700 lbs. per square inch and at a temperature lying between about 200° C. and the dew point of the polymer in the resultant vapors and gas, removing the resultant vapors and gas and recovering normally liquid polymers therefrom.

3. The process of polymerizing iso-butylene which comprises passing a continuous stream of butene over a solid absorbent material wetted with sulfuric acid of from 50 to 65 per cent strength at a temperature of from about 100° C. to about 200° C. and under a pressure of from 50 to 700 pounds per square inch, and separately condensing the resultant polymers.

4. The process of polymerizing iso-butylene which comprises continuously passing a stream of butene gas containing iso-butylene over a zone of extended surface, simultaneously introducing sulfuric acid of from 50 to 60 per cent strength to said zone for concurrent flow therethrough, maintaining said zone at a temperature of from about 100° to 200° C., removing acid therefrom at a strength of from 60 to 65 per cent, adding water thereto to dilute it to a strength of between 50 and 60 per cent and recycling the diluted acid to said zone for further contact, removing resultant gaseous and vaporous products from said zone and condensing resultant polymers therefrom.

DONALD R. STEVENS.
WILLIAM A. GRUSE.

CERTIFICATE OF CORRECTION.

Patent No. 2,135,117.                                         November 1, 1938.

DONALD R. STEVENS, ET AL.

It is hereby certified that error appears in the printed specification of the above numbered patent requiring correction as follows: Page 2, second column, line 24, for "broadcast" read broadest; line 49, claim 3, for "butene" read iso-butylene; and that the said Letters Patent should be read with this correction therein that the same may conform to the record of the case in the Patent Office.

Signed and sealed this 20th day of December, A. D. 1938.

Henry Van Arsdale (Seal)                                          Acting Commissioner of Patents.